Nov. 17, 1953                C. K. STEINS ET AL                 2,659,318
                FREIGHT CAR FOR DOUBLE-DECK LOADING OF AUTOMOBILES
Filed Oct. 13, 1950
                                                                7 Sheets-Sheet 2

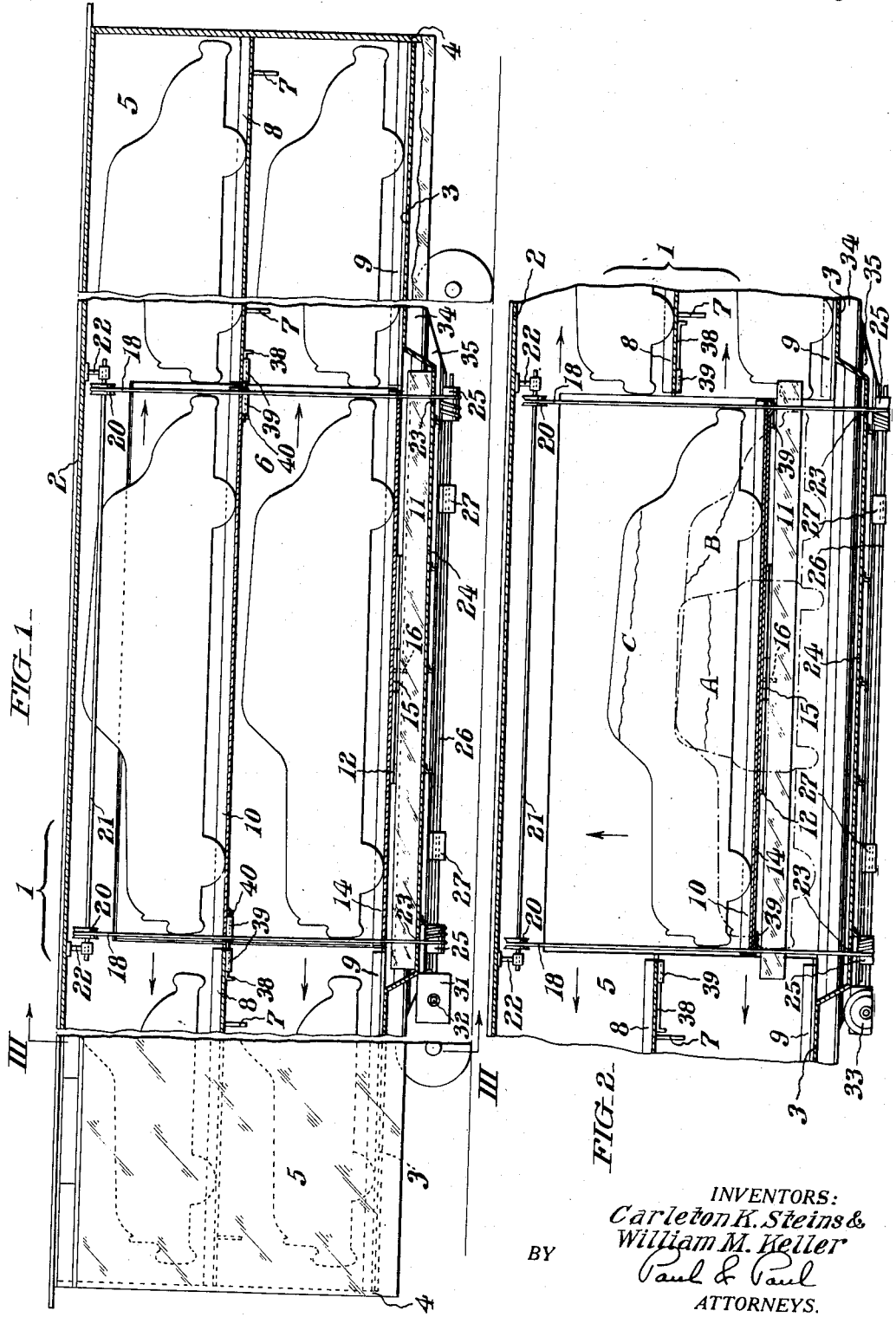

INVENTORS:
Carleton K. Steins &
William M. Keller
BY
Paul & Paul
ATTORNEYS.

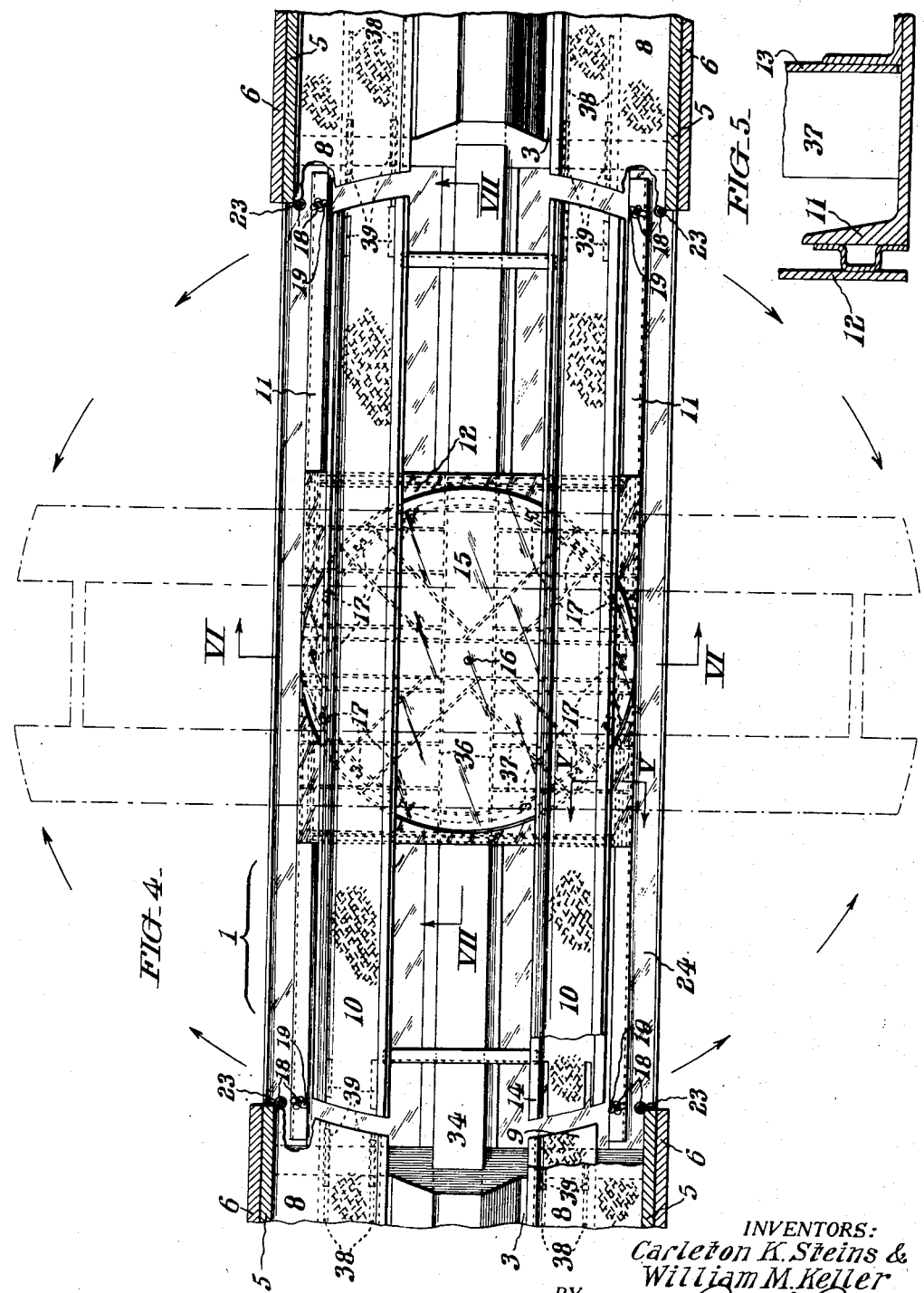

Nov. 17, 1953  C. K. STEINS ET AL  2,659,318
FREIGHT CAR FOR DOUBLE-DECK LOADING OF AUTOMOBILES
Filed Oct. 13, 1950  7 Sheets-Sheet 4
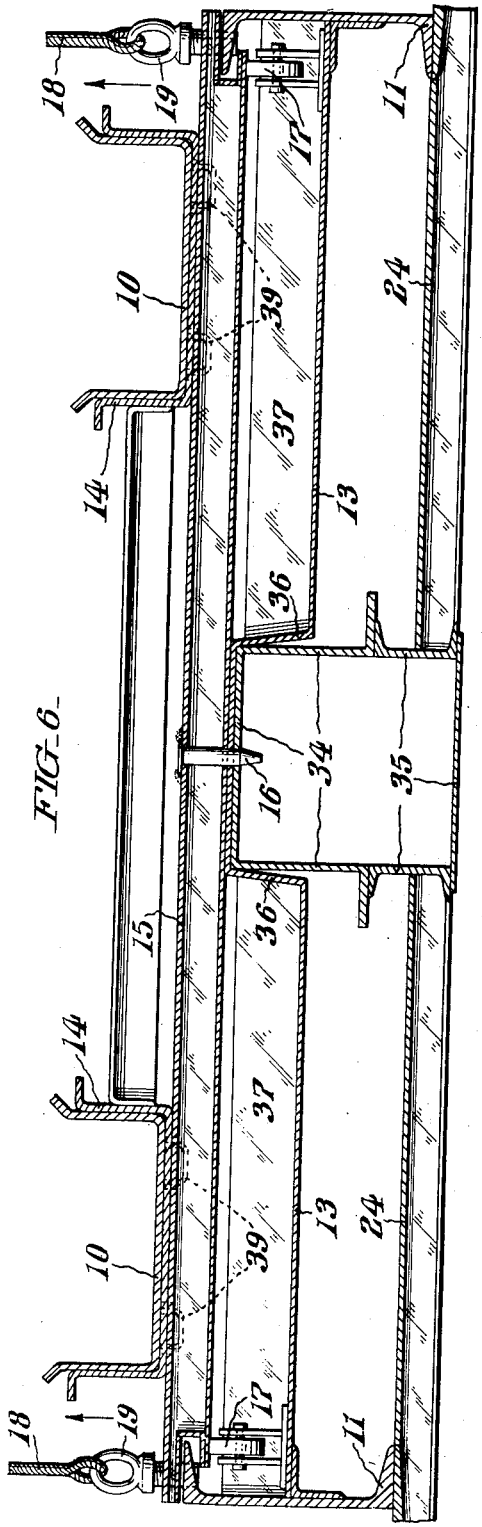
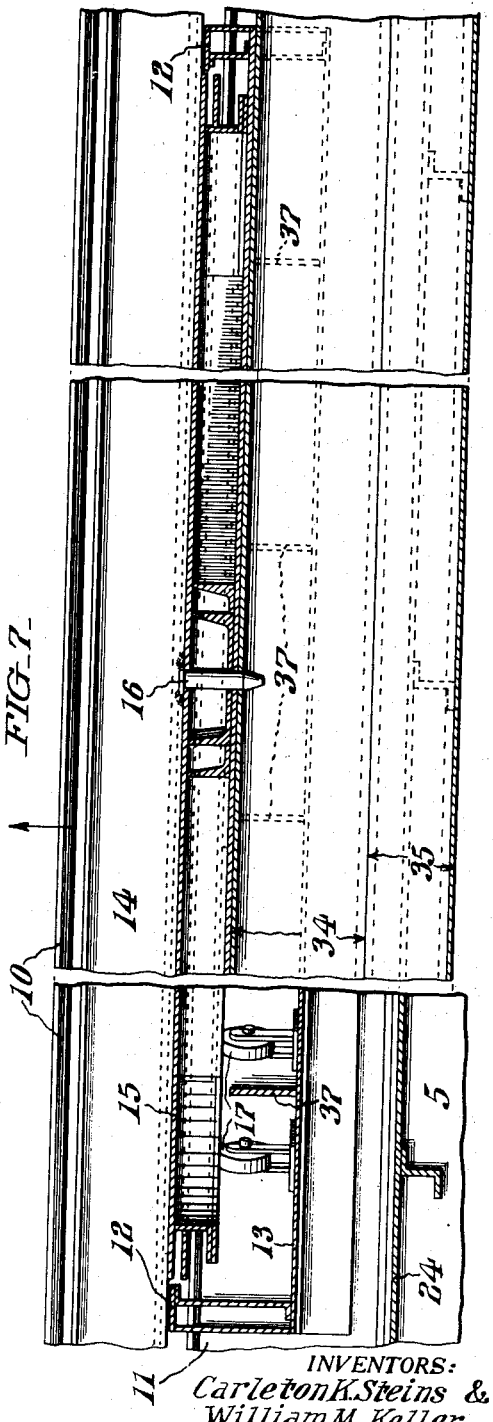
INVENTORS:
Carleton K. Steins &
William M. Keller
BY Paul & Paul
ATTORNEYS.

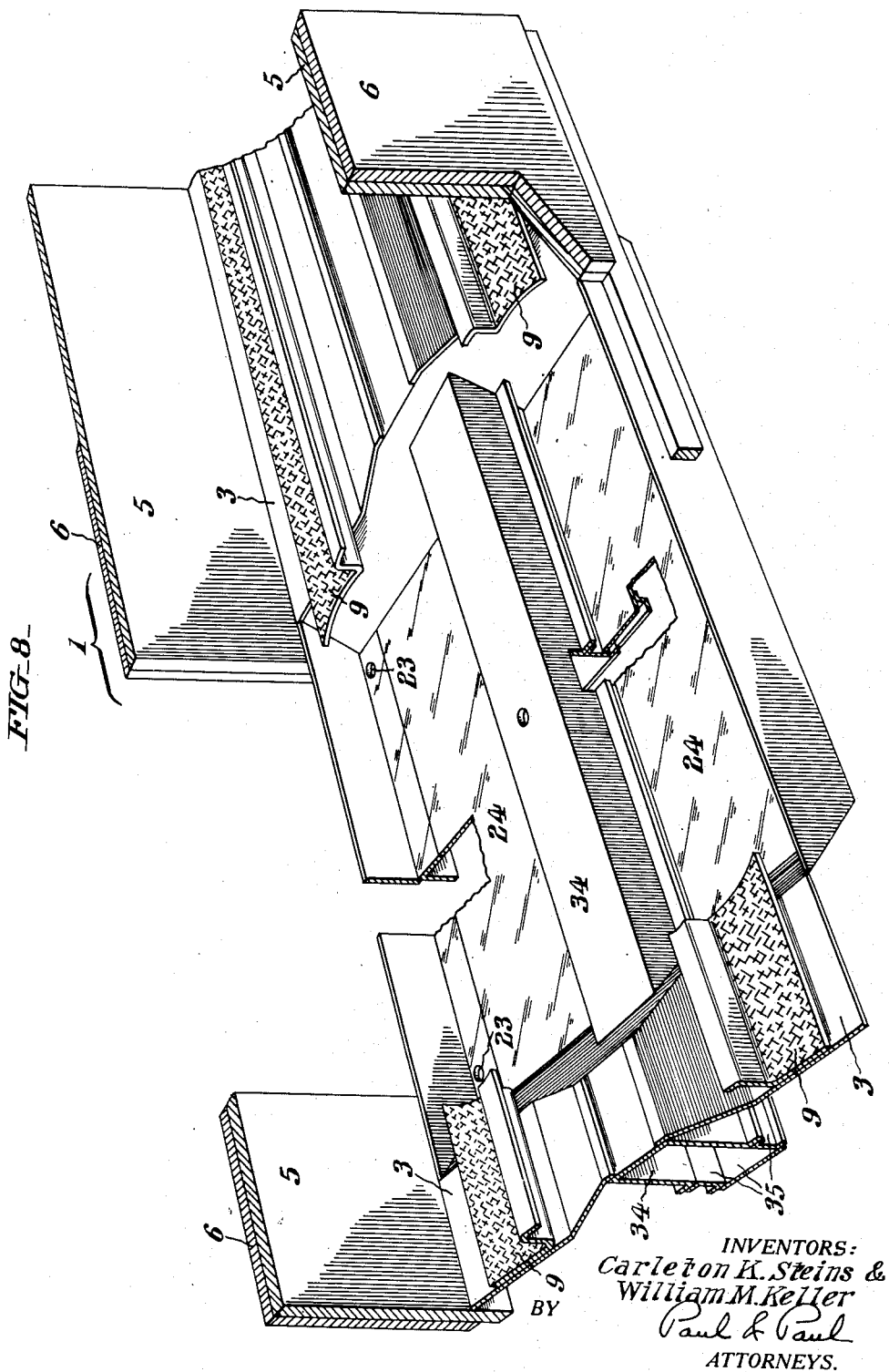

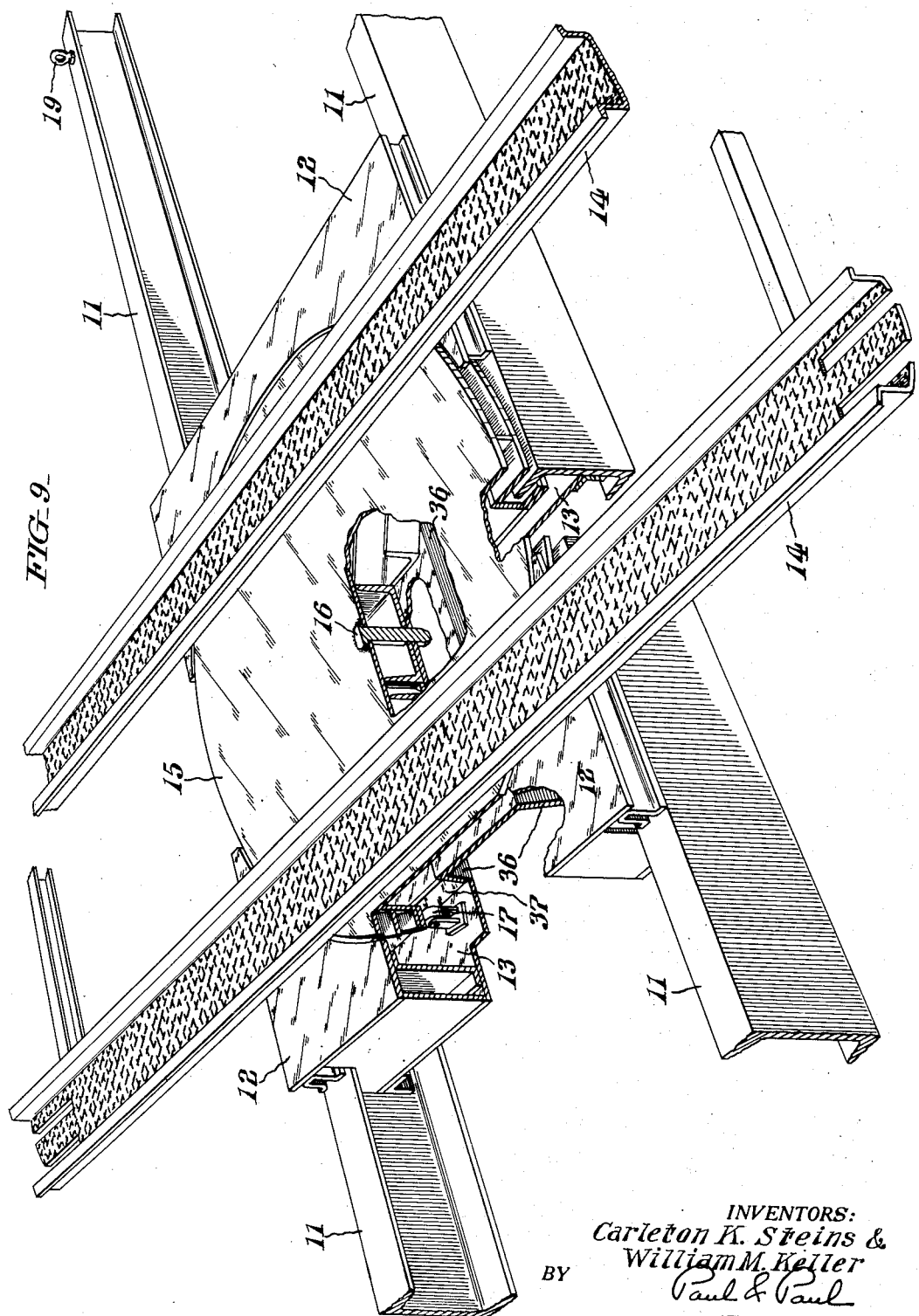

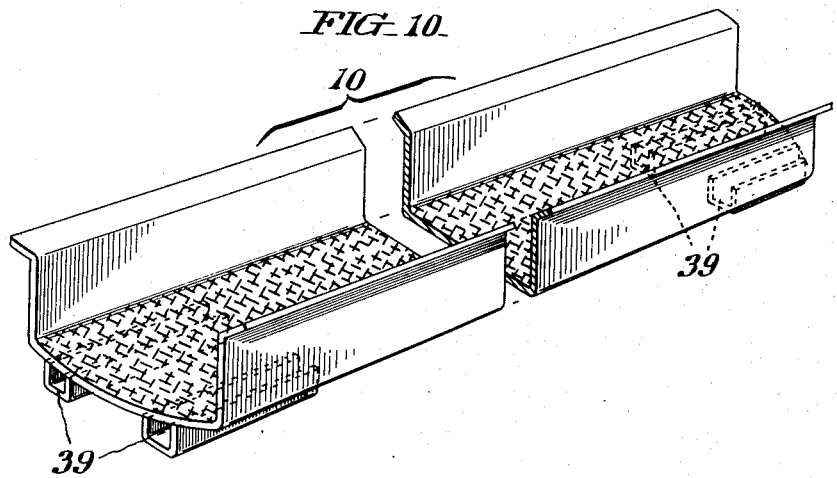
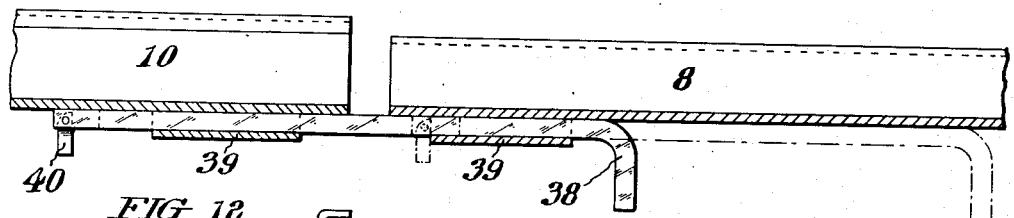
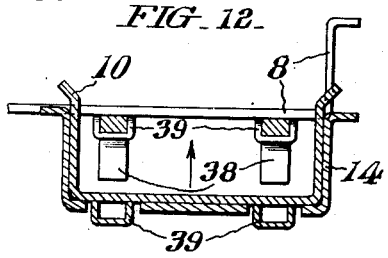
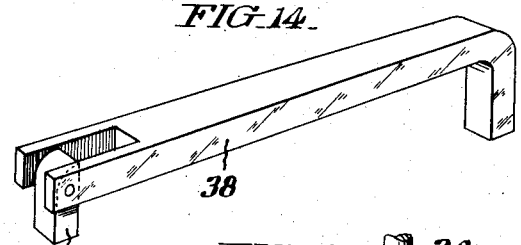
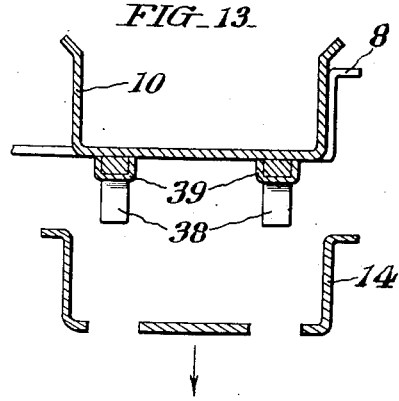
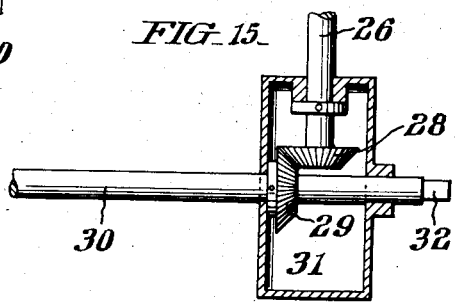

Patented Nov. 17, 1953

2,659,318

UNITED STATES PATENT OFFICE 2,659,318

FREIGHT CAR FOR DOUBLE-DECK LOADING OF AUTOMOBILES

Carleton K. Steins, Overbrook, and William M. Keller, Merion, Pa., assignors to The Pennsylvania Railroad Company, Philadelphia, Pa., a corporation of Pennsylvania Application October 13, 1950, Serial No. 189,912

5 Claims. (Cl. 105—368)

This invention concerns side loading freight cars for the transportation of wheeled vehicles and their loading mechanism. In loading such cars it is important to put a maximum number of vehicles for transportation in safe position in the car, and to this end such cars are usually double-decked whereby one line of vehicles, such as automobiles, may occupy the normal floor of the car, and another line occupy ways or a floor situated at an upper level. When such freight cars are to be loaded from the side, as is very desirable, it becomes necessary to provide a turning device in the car whereby a vehicle entering from the side may be turned to longitudinal position in the car and thence proceed to the part of the car which it is to occupy during transportation. Such a device is shown in U. S. Patent to Demarest, No. 2,146,203, dated February 7, 1939. The provision of this turning device or turntable ordinarily interferes with loading the car to its full capacity. It is the object of our invention to provide for the use of such devices in such a freight car without lessening the number of vehicles which the car is able to carry.

To this end the turntable is mounted on an elevator platform which may occupy either an upper or lower position; and separable ways are provided on which a vehicle rests after it enters the car at the lower level and which are carried by the elevator to the upper level and are capable of remaining in this upper position with the vehicle which they carry after the elevator descends.

In the accompanying drawings I have shown and I will describe, a side entrance freight car with such a turntable and with provision for the transportation of vehicles, such as automobiles, at two levels. The length of the car, and therefore the number of vehicles which it can carry, may vary, but conveniently the car carries three automobiles at each level. The side entrances are usually more or less central as is the elevator, and by reason of the provision of the separable ways which remain beneath an automobile raised to the upper level notwithstanding the descent of the elevator, it results that when the last automobile is in place in the car it is carried in a position directly underneath the automobile which rests on the separable ways and occupies the central position in the car at the upper level, enabling the car to carry at least six automobiles, or more if the car is long enough, there always being as many vehicles carried on the upper level as on the lower.

In the accompanying drawings, Fig. 1 is a side elevational drawing of a loaded car embodying my invention.

Fig. 2 is a diagrammatic showing of the loading of a car by the use of a motor 33. Three vehicle positions are indicated, A (in dotted lines) being the initial entrance position of the vehicle resting on a turntable turned crosswise; B (in dotted lines) being the same car turned longitudinally into lifting position; and C (in full lines) being the vehicle as it is lifted by motor and lifting mechanism.

Fig. 4 is a plan view of the central part of a car showing the elevator and turntable and the doorways.

Fig. 5 is a section taken as indicated by the angled arrows V—V in Fig. 4 showing support for plate.

Fig. 6 is a section through elevator and turntable taken as indicated by the angled arrows VI—VI in Fig. 4.

Fig. 7 is a section at right angles to the last, through elevator and turntable taken as indicated by the angled arrows VII—VII in Fig. 4.

Fig. 8 is a perspective of car in region of doorway with elevator and turntable removed and parts broken out to show construction.

Fig. 9 is a perspective of elevator and turntable with turntable moved, separable ways being removed and certain parts broken out to show construction.

Fig. 10 is a perspective of one of the separable ways.

Fig. 11 is a sectional view showing a removable separable way held in elevated position by keeper as indicated by full lines; the dotted lines showing keeper drawn back to unlock the separable way.

Fig. 12 is a diagrammatic sectional view showing part of turntable separable way to top position.

Fig. 13 is a diagrammatic sectional view showing separable way locked, turntable passing down below.

Fig. 14 is a perspective view of keeper removed.

Fig. 15 is a section through gear box in Fig. 3 showing bevel gears to operate lifting mechanism.

Figure 3:
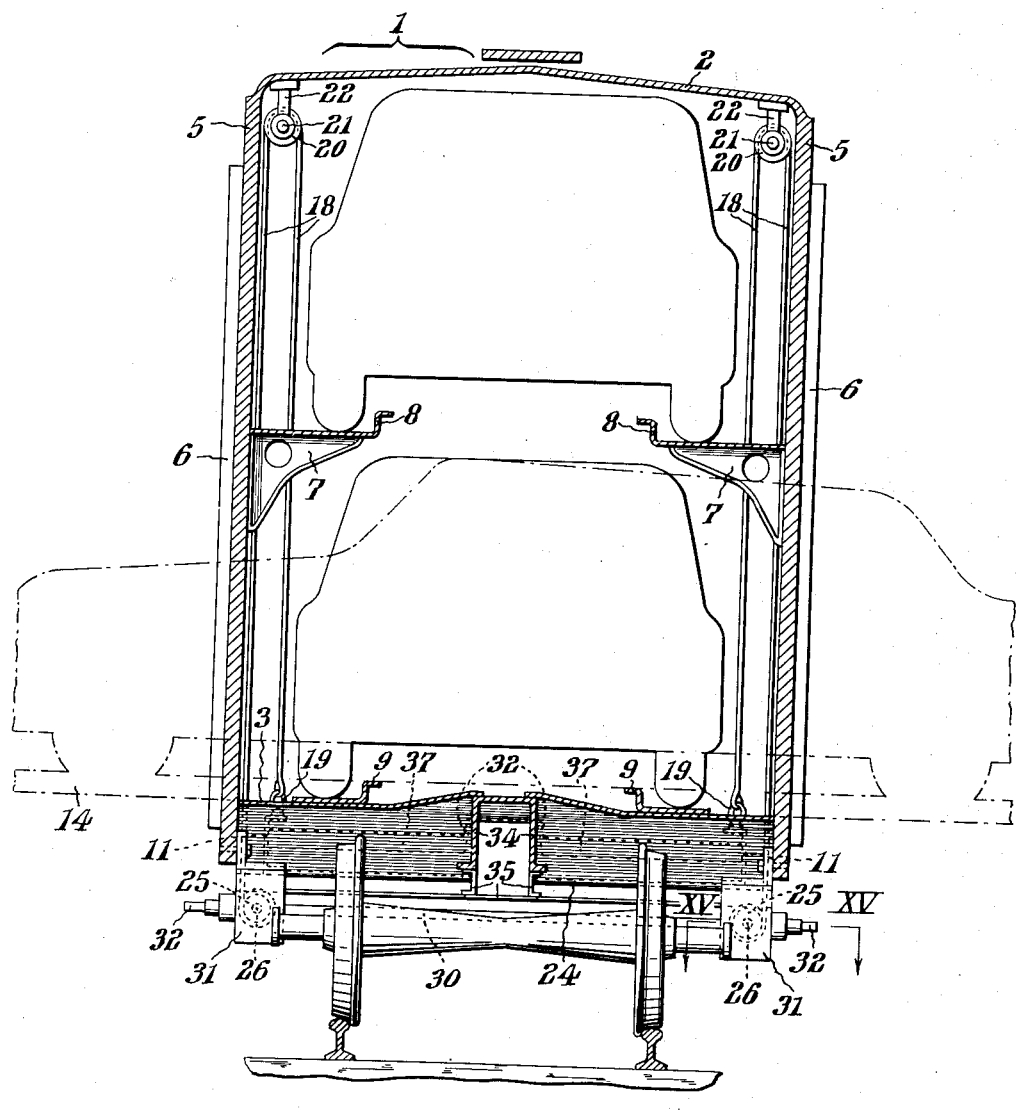
Fig. 3 is a diagrammatic elevational view in section as indicated by the angled arrows III—III in Fig. 1.

In these drawings, 1 indicates generally the railway car which may have a length and height which can transport three or more automobiles at its lower level and three or more at its upper level. 2 indicates the roof of the car and 3 its floor. 4 are the ends of the car, 5 its sides and 6 the doors which are generally central and 24 a sub-floor situated between the doors. 7 indicates cantilever brackets which support the tracks 8 which carry vehicles at the upper level. 9 are the tracks upon which rest vehicles at the lower level. 10 is a pair of separable channel section ways forming a short track which at times occupy the lower level and at other times are raised by the elevator to the higher level and with the vehicle which rests upon them and are there retained at the higher level during transportation. 11 are the side frames of the elevator by which vehicles are lifted from lower to upper positions. 12 is the upper floor of the elevator and 13 is a lower floor and roller platform. 14 are channel section turntable treads on which a vehicle entering from the side rests while entering and while being turned to a longitudinal position, and on which it may remain for transportation. In certain of the figures the separable ways 10 are shown resting on and within the turntable treads 14, while in others the separable ways are retained at the upper level although the turntable has descended to the lower level. 15 is the turntable seated within the upper floor 12 of the elevator where it rotates on a center pin 16 with the aid of turntable rollers 17 carried by the roller platform 13 of the elevator. 18 are cables attached at one end to an eye bolt 19 fast upon the elevator frame. From this point of attachment the cables pass up and over pulleys 20 on the pulley shaft 21 supported by a bearing 22 from the top of the car. Each cable then passes down through holes 23 in the sub-floor 24 to a drum 25 mounted on the drum shaft 26 running longitudinally of the car in the region of the side doors and beneath the bottom of the car. This shaft is carried by bearings 27 and at one end carries a bevel gear 28 meshing with a bevel gear 29 mounted on shaft 30 carried by and contained within a gear box 31, reaching below the car floor. The extremity of shaft 30 is shaped at 32 to fit a connection from a motor 33 provided for the operation of the elevator while the car is being loaded or unloaded. 34 is the center or draft sill of the car supported by reinforcing members 35. It is provided on its upper side with an aperture within which rests the lower end of the centering pin 16 of the turntable when it is at its lower and operative position. This pin thus serves to center the turntable both with reference to the elevator and the sill of the car. The lower side of the turntable is provided with guides 36 connected by web plates 37 to the side frames of the elevator. These guides help to carry the pin 16 to the central aperture in the center sill.

There are two separable ways shown in the drawings, one for each side of the vehicle. They may however be connected and so together form a separable false platform.

At each end of each upper track 8 on its under side a bolt 38 slides in a keeper 39. The bolt is capable of reception within another keeper member 39 on the under side of the corresponding separable way 10, and when thus shot holds the movable way in registry with the fixed upper track. The position of the bolts and keeper may be reversed. The bolt has a handle at one end, and at the other a pivoted pendant 40 which helps to prevent any unintentional disengagement of bolt and keeper.

In operation automobiles or other vehicles may be put on the car from either side, for which purpose the turntable is turned crosswise the car with the door of the car open. When the vehicle is within the car the turntable is turned lengthwise the car and the vehicle is run toward either end of the car to its transporting position. By raising the elevator, with its turntable and a vehicle resting on it, to the upper position the vehicle may be run towards either end of the car on the way of the upper position. During these operations the separable ways are preferably carried by and within the turntable treads, but after the desired number of vehicles have been loaded on the upper tracks or permanent ways, the elevator raises another vehicle to the upper central position and the separable ways on which this vehicle rests are locked in the upper position by throwing the bolts 38 into locking position (see Fig. 11) whereupon the elevator descends leaving the separable ways at the upper level. Still another vehicle may then be loaded on the turntable treads and so carried by the car directly below the vehicle carried by the separable ways locked in the upper position, thus enabling the car to carry the maximum number of vehicles.

The specific form of many of the parts which I have described may be changed while yet embodying my inventive idea. Thus, instead of driving shaft 30 as shown, it may carry a motor with means for connection to outside current when the car is at rest.

Having thus described our invention, we claim:

1. A side loading freight car capable of carrying vehicles at an upper and lower level and provided with an elevator having on it a turntable with turntable treads for vehicles, and also separable ways, and means whereby the separable ways may be locked and held in the upper position when the elevator descends to its lower position.

2. A side loading freight car capable of carrying vehicles at an upper and lower level including both upper and lower fixed ways and also provided with an elevator having on it a turntable with tracks for vehicles, and also separable ways, and means whereby the separable ways may be locked and held in the upper position when the elevator descends to its lower position, said means comprising keepers on the under side of the separable ways at their extremities and on the under side of the upper fixed ways, and bolts which when passed through the keepers lock the movable ways in registry with the upper fixed ways.

3. A side loading freight car capable of carrying vehicles at an upper and lower level and provided with an elevator having on it a turntable with treads for vehicles, and also separable ways, and means whereby the separable ways may be locked and held in the upper position when the elevator descends to its lower position, the turntable being fitted with a downwardly projecting centering pin, which passes through both the elevator floor and a central hole in the sill of the car into which the pin fits when the elevator descends to its lower position.

4. A side loading freight car with fixed tracks for vehicles at upper and lower levels at opposite ends thereof; an elevator medially of the car having on it a turntable with separable ways for vehicles capable of registry with the fixed tracks at the different levels for transfer thereto of the vehicles; and means whereby the separable ways may be locked and held in the upper position when the elevator descends to its lower position.

5. A freight car according to claim 4, wherein the separable ways are of channel cross section and normally nest within channel section wheel tracks on the turntable.

CARLETON K. STEINS.
WILLIAM M. KELLER.

References Cited in the file of this patent

UNITED STATES PATENTS

| Number | Name | Date |
|---|---|---|
| 1,186,035 | Posson | June 6, 1916 |
| 1,229,714 | Clark et al. | June 12, 1917 |
| 1,250,982 | Daly | Dec. 25, 1917 |
| 1,866,798 | Christie | July 12, 1932 |
| 1,894,534 | Dolan | Jan. 17, 1933 |
| 2,578,784 | Dath | Dec. 18, 1951 |